United States Patent [19]

McCullough, Jr. et al.

[11] Patent Number: 5,587,434
[45] Date of Patent: Dec. 24, 1996

[54] PROCESS FOR POLYMER DEGRADATION

[75] Inventors: James D. McCullough, Jr., Houston; John F. Bradford, Katy, both of Tex.

[73] Assignee: Union Carbide Chemicals & Plastics Technology Corporation, Danbury, Conn.

[21] Appl. No.: 542,719

[22] Filed: Oct. 13, 1995

[51] Int. Cl.$^6$ .................................................. C08F 8/04
[52] U.S. Cl. ........................ 525/333.8; 525/387; 525/388
[58] Field of Search ............................... 525/387, 333.8, 525/416

[56] References Cited

U.S. PATENT DOCUMENTS

| 2,628,214 | 2/1953 | Pinkney et al. | 525/387 |
| 3,144,436 | 8/1964 | Greene et al. | 525/387 |
| 4,897,452 | 1/1990 | Berrier et al. | 525/387 |

FOREIGN PATENT DOCUMENTS

| 0238796A2 | 9/1987 | European Pat. Off. . |
| 0287239B1 | 11/1993 | European Pat. Off. . |

OTHER PUBLICATIONS

Coates, P. D. et al., "Reactive Extrusion of Polyolefins: In-Process Measurements." Pub. in 'ANTEC 95' (Annual Technical Conference of the Society of Plastics Engineers), pp. 1620–1624.

Bonilla-Rios, J. et al., "Effects of Temperature, Peroxide Concentration, and Peroxide Addition Technique on the Molecular Weight Distribution of Controlled Rheology Polypropylene Resins." Pub. in 'ANTEC 95' (Annual Technical Conference of the Society of Plastics Engineers), pp. 1625–1629.

Bonilla-Rios, J. et al., "A Stochastic Model For the Prediction of the Molecular Weight Distribution of (Controlled Rheology) Peroxide Degraded Polypropylene." Pub. in 'ANTEC 95' (Annual Technical Conference of the Society of Plastics Engineers), pp. 1630–1634.

Bonilla-Rios, J. et al., "Effects of Temperature, Peroxide Concentration and Incorporation Technique on the Rheological Properties of Polypropylene Controleed Rheology Resins." Pub. in 'ANTEC 95' (Annual Technical Conference of the Society of Plastics Engineers), pp. 1848–1852.

Rocha, M. et al., "A Study of Polypropylene Peroxide Promoted Degradation." Pub. In Journal of Polymer Testing, V 14, N 4, pp. 369–380 (1995).

Hwo, C., Ma, G. and McCullough, J., co-pending U.S. Patent Application entitled, "Process For Improving Processability of Ultra Low Flow Melt Viscosity Polymer." Ser. No.: 395,365. Filed Feb. 21, 1995.

Lew, R., Cheung, P., Blake, S. T., "Reactive Extrusion of Polypropylene." Pub. in Computer Applications in Applied Polymer Science, pp. 516–520.

*Primary Examiner*—Thomas R. Weber
*Attorney, Agent, or Firm*—Andrew S. Reiskind

[57] ABSTRACT

A process for reacting molten polyolefin with a free radical generator wherein the molten polyolefin passes through an extruder and free radical generator is mixed with the molten polyolefin in increments along the extruder such that any previously added free radical generator is decomposed before the next increment of free radical generator is added to the molten polyolefin. Products of the process demonstrate improved efficiency of free radical generator utilization as measured by enhanced melt flow rates relative to the total amount of free radical generator used.

21 Claims, 1 Drawing Sheet

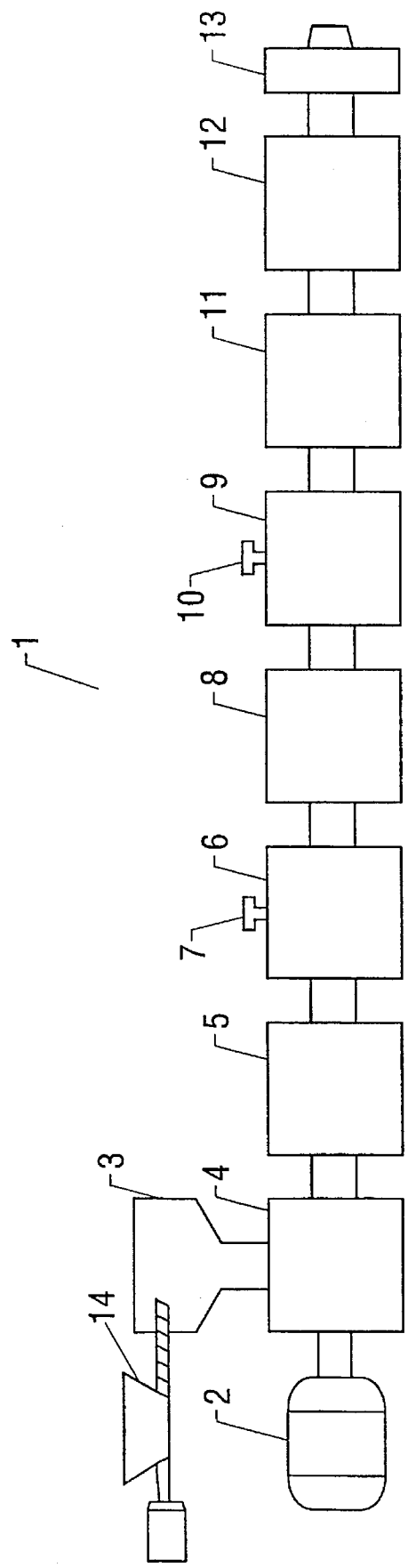

PROCESS FOR POLYMER DEGRADATION

FIELD OF THE INVENTION

This invention is directed to an improved process for lowering the molecular weight and narrowing the molecular weight distribution of polymers, and particularly stereoregular polyolefins. The invention may also be used to increase polymer molecular weight when crosslinkable moities are present. The process of the invention can also be used to lower the molecular weight and narrow the molecular weight distribution of other polymers that incorporate olefins in their backbones and contain other monomer entities, including those that contain oxygen or nitrogen in various functional relationships.

BACKGROUND OF THE INVENTION

It is well known in the art that the molecular weight of polyolefin compositions, particularly those primarily composed of polymers or blends of polymers made from alpha-olefins, may be lowered by heating the polyolefins in the presence of a free radical generator such as an organic peroxide. This process of altering the polymer is commonly referred to as "degradation." Other nomenclature such as vis-breaking, chemical cracking and controlled rheology have also come into broad use in describing the degradation process. Polymer thus modified may be collected as pellets and fabricated into a variety of products including textiles, films, extruded goods and molded goods. The modified polymer is easier to process than its parent material and exhibits important property improvements such as reduced die swell and reduced brittleness.

While it is possible to degrade polyolefins merely by heating them, this method of degradation is limited because polymers will thermally decompose at temperatures as low as about 260° C. It is also possible to chemically induce degradation of polymers with free radicals produced by the decomposition of free radical generators, such as organic peroxides. Treatment of a polymer with these radicals leads to radical attack on the polymer and associated chain scission. Polymer degradation through the use of free radical generators favors production of shorter, lower molecular weight chains and a net narrowing of the molecular weight distribution. These properties are all considered desirable when the polymers are to be used commercially.

For various practical reasons, the commercial producer of polymers typically does not directly measure the polymer's molecular weight, but instead depends on indirect representations of it, the most common of which are the polymer's melt flow, as measured by ASTM D 1238, Condition L; the polymer's melt index, as measured by ASTM D 1238, Condition E; and the polymer's viscosity. In general, as a polymer's molecular weight decreases, its melt flow and melt index increase and its viscosity decreases.

Certain polymers do not degrade upon treatment with free radicals, but instead exhibit an increase in molecular weight. This is because the starting polymer contains crosslinkable moities. An increase of the molecular weight in these crosslinked polymers is actually a desired property. The process disclosed herein is also useful for producing higher molecular weight in these crosslinked polymers.

While the use of free radical generators such as organic peroxides in the degradation of polymers is well established, the process is expensive, especially when large changes in the molecular weight of polymer are desired. In order to effect large changes in polymer viscosity, a commensurately large amount of free radical generator must be added. These free radical generators are generally expensive, making the cost of processing the polymer prohibitively high. Thus there is a need for a process for the degradation of polymers that is highly efficient in its consumption of free radical generators.

In addition to the high processing costs associated with degrading polyolefins using free radical generators, there are operational problems associated with using free radical generators for producing degraded polyolefins. For example, it is generally known that products made from polymers that were subjected to a large change of viscosity may suffer from non-uniformities of composition that make the product unsuitable for commercial use in article fabrication. Additionally, excessive dosing of free radical generators during the preparation of the polymer can cause surging, foaming, difficulty in pelletization and other processing problems. These processing problems are largely overcome when the polymer is prepared according to the teachings of the present invention.

RELATED ART

In U.S. Pat. No. 3,144,436, Green and Pieski describe a process for degrading stereoregular polymers that entails controlled injection of a free radical initiator into an essentially oxygen free melt zone of an extruder. Ideally, the initiator selected provides an adequate source of free radicals at the temperature of operation when mixing is complete. The free radical initiator is dissolved in hydrocarbon solvent and then injected preferably into an extrusion zone where the temperature is below that required for complete degradation of the polymer. As the components become thoroughly mixed, the melt then passes into a hotter zone where the initiator decomposition is carried to essential completion. The reaction is considered complete after about six half-lives of the initiator, i.e., when its concentration has been reduced to about 1.5% of its initial concentration.

In instances where the desired melt index of the product is greater than 50 times that of the melt index of the parent material, it is preferable to carry out the reaction stepwise, in two or more operations, by convening the very high molecular weight resin into a moderate molecular weight product and then reprocessing the moderate molecular weight product to produce the desired very low molecular weight material. Practicing the process in two steps reduces the incidence of unwanted foaming when compared to using a one step operation. While its two step process may be effective for producing large viscosity changes, it requires two extrusions, each with a ramped temperature profile.

In Bonilla-Rios et al.'s article presented in the Annual Technical Conference of the Society of Plastics Engineers— Boston, May 7–11, 1995, "ANTEC '95", reprint pp. 1625–1634; 1848–1852, a Brabender batch mixer was used in the study of different peroxide addition modes. A series of differing peroxide addition situations were studied. Although the cases differed in number and timing of peroxide injection, in each instance, the mixing was stopped when the peroxide was injected. In essence, the peroxide was injected into a quiescent melt. Thus local concentrations of undispersed peroxide resulted during the time interval between start of injection until the rotor was brought up to speed.

Coates et al., pp. 1620–1624 of reprints of ANTEC '95, presents work which shows the vis-breaking of polypropylene as well as the crosslinking of LLDPE. Peroxide is fed either at the main feed port of an extruder or part way down the barrel. In-process measurements conducted shows that the apparent viscosity dropped with increasing melt temperature.

Barrier et al., U.S. Pat. No. 4,897,452, discloses a degradation process that involves adding two different free radical generators, G1 and G2, to the polymer. The half-life of G2 is at least 20 times greater than that of G1 at the pelletizing temperature. The half-life of G2 is such that it remains substantially intact after the pelletizing extrusion. G2 may be added separately into a zone where G1, which has much lower stability, may have already started to decompose. The mixing zone for G2 addition is maintained at a temperature below the decomposition temperature of G2, so there is no G2 induced polymer degradation at the time of its addition. This method has the disadvantage that high temperatures and/or prolonged heating are required during the conversion of pellets to finished articles by the users in order to complete the decomposition of the G2 free radical generator. Furthermore, during subsequent processing of the pellets, the user must deal with the undesirable byproducts of decomposition of active free radical generator, such as unacceptable levels of tertiary butyl alcohol.

While related art discloses a wide selection of free radical generators and means to add them to the polymer, it does not provide for improved economy of free radical generator use, nor does it describe simple processes not involving reprocessing that ensure ease of melt processing and uniform product properties. A new process has now been found which satisfies these requirements.

SUMMARY OF THE INVENTION

The present invention provides an improved process for controlling molecular weight reduction of polymers, including polyolefins and other olefin containing polymers that undergo scission upon contact with free radicals in a melt extruder. Conversely, when the invention is used to process polymers that contain high levels of crosslinkable material, the melt flow of the resulting crosslinked product decreases. In the case of crosslinked polymers, decreased melt flow is a desired attribute.

Free radicals are used to degrade the polymer. The free radicals are derived from free radical generators, such as organic peroxides, which are added to the polymer as it passes through a melt mixing device, such as a melt extruder. In particular, the invention provides the processing of polyolefins in a melt mixing device with the free radical generators added at more than one addition zone along the length of the melt mixing device. An addition zone is defined as a given distance from the location where the polymer is fed to the melt extruder. When practicing the invention, free radical generator that has been added to the melt mixing device is preferentially substantially degraded before it reaches the next free radical generator addition zone or the die, whichever comes first. Therefore, the half-life of the free radical generator, along with the processing conditions such as melt temperature, can be used to calculate the appropriate distance between free radical generator addition zones.

When polymer degradation is practiced according to the invention, the melt flow of the polymer after treatment will be higher than the starting melt flow, except in cases where the polymer feed contains high concentrations of crosslinkable material. Further, when compared with the results of conventional polymer processing using an equivalent amount of free radical generator, the product of this invention shows measurable melt flow enhancement. Additionally, polymer processed according to this invention will tend to be more stable and possibly require less stabilizer than polymer produced by conventional means involving less efficient mixing of free radical generator and polymer. The invention also discloses the preferred method of mixing polymer with free radical generator when processed in a melt mixing environment.

DETAILED DESCRIPTION OF THE INVENTION

This present invention is directed to an improved process for controlling molecular weight reduction of polyolefins and other olefin containing polymers that undergo scission upon contact with a free radical in a melt mixing device. More particularly, the present invention relates to free radical induced degradation of polymer in a melt mixing device, such as a melt extruder, through the use of multiple free radical generator addition zones along the length of the extruder barrel wherein the actual physical location of each addition zone is determined in part by the half-life of the free radical generator. The free radical generator added at an upstream addition zone is preferentially substantially degraded before the polymer it is treating reaches the next downstream addition zone or the die, whichever comes first. The change of a polymer's melt flow can be used to indicate the degree of degradation it has undergone. While it is preferred that substantially all of the free radical generator be degraded before the melt it is treating reaches the next addition zone or the die, it is possible to obtain the benefits of the invention when at least about 90% or even about 80% of the free radical generator has degraded before it reaches the next addition zone.

Practicing the invention involves thorough mixing of the polymer with the free radical generator. At least for the first free radical generator addition zone, the free radical generator is preferably added into or slightly ahead of a high intensity and high shear mixing section in order to provide dispersive mixing. This can be accomplished with kneading blocks configured for dispersive mixing. The actual intensity of mixing required is a function of the viscosity of the mixture at that location. The less viscous the mixture, the less intensive the dispersive mixing needs to be. The relationship between required mixing and melt viscosity applies to each place where free radical generator is added along the melt mixing device.

To practice the invention, there must be at least two addition zones along the length of the melt mixing device. The preferred number of addition zones depends on the half-life of the free radical generator and the overall residence time under the processing conditions. At each injection zone, there may be more than one physical place or addition point at which the free radical generator is added. For example, in one addition zone there can be more than one injection point, each placed circumferentially around the melt mixing device. This is desirable when the melt mixing device is of a large diameter and free radical generator added at one side of the extruder might not adequately distribute to the other side. A process control scheme can be used to regulate the rate of addition of free radical generator in the various free radical generator addition zones to obtain the desired degree of vis-breaking. In the practice of this art it is desirable to vent volatiles from the melt mixing device through suitable venting equipment and not allow them to accumulate in the extruder environs.

Antioxidant stabilizers can be used, however, their use should be limited to the extent possible where free radical decomposition takes place in order to avoid interactions between free radicals and the stabilizer. If high levels of stabilizer are needed, it is preferable to add them toward the die and away from the region where the vis-breaking activity takes place. This is especially true when using stabilizers, such as phosphite and phosphonite processing stabilizers, that are highly prone to interacting with free radicals. However, the use of moderate levels of these same additives under normal circumstances should not diminish the advantages of this invention.

The selection of a free radical generator must be coordinated with the melt mixing device's residence time, the melt temperature and the number of addition zones. When the free radical generator is mixed with melted polymer, the free radical generator will begin to decompose. The rate of decomposition of the free radical generator is typically referred to in terms of its half-life. After one half-life, half of the free radical generator will have decomposed. If the minimum time it takes for polymer to travel from one point to another along the melt mixing device is known, then one can predict how much free radical generator has decomposed at a given distance from where the free radical generator was added to the melt mixing device. The flow rate of polymer through the melt mixing device can be measured by introducing a colored pellet at an addition point and measuring the time it takes for the color to appear at the die orifice. For a given melt mixing device, if the half-life of the free radical generator is very long, then the number of free radical addition zones may be severely limited, thus reducing the benefits available from practicing the invention.

The addition of free radical generator to a melt mixing device such as an extruder may be accomplished by any of several conventional means well known to those with skill in the art. These include devices which allow for atomization or dropwise addition of the free radical generator. Free radical generator can be added to an extruder operating at a high pressure, intermediate pressure, or atmospheric pressure. Although it is preferred to use liquid free radical generator, either neat or in solution or dispersion, free radical generator may also be added mixed in a melt via a side-arm extruder. Solid free radical generator can be added via hopper feeders. Furthermore, a suitable surfactant can be added to the free radical generator or the free radical generator's diluent in order to improve its dispersion and distribution in the melt.

While it is preferable to add the free radical generator to polymer that is completely melted, the addition of free radical generator to polymer that is at least substantially all melted, i.e., containing small amounts of solid phase polymer, is also acceptable at any addition zone. Free radical generator can also satisfactorily be added to polymer containing large amounts of solid phase polymer, so long as this takes place in the first addition zone. When the free radical generator is a solid, as is the case with solid peroxide, peroxide coated on silica or calcium carbonate, or peroxide masterbatched with polymer, including blends or coatings on or with polymer powder, prills or as pellets, there will be, for at least a transitory period, solids in the zone where the free radical generator and the polymer mix. This is especially apparent when the free radical generator is supported on inorganic media. Polymer processed according to the invention may also contain inorganic or organic fillers. When the free radical generator is added as a melt phase, as from a side-arm extruder, then direct mixing of melt phases will occur. The melt phases may be of the same type of polymer or they may differ such that one, generally that polymer present in minor amount, becomes dispersed in the one present in major amount.

Polymers well suited for use in this invention include all scissionable polyolefins, common examples of which include propylene homopolymer, propylene copolymers of the so-called "random" type, propylene copolymers of the sequential type, sometimes called "block"; terpolymers of structures analogous to the aforementioned copolymers, butene-1 homopolymer, butene-1 copolymer, butene-1-ethylene copolymers, butene-1-propylene copolymer, ethylene copolymers with alpha-olefins of three or more carbons, containing same in an amount permitting a degree of scission and mixtures of any of the above. Also included are those copolymers or terpolymers of alpha-olefins that incorporate other monomers that include oxygen and/or nitrogen atoms in various molecular arrangements. This invention can also be used to process blends of scissionable and crosslinkable entities, with examples being respectively polypropylene and polyethylene. Any of the above may contain inorganic or organic fillers or reinforcements, with the filler or reinforcement present during the processing or added afterwards in a separate blending step. Graftable monomers such as maleic anhydride, which offer improved surface activity, may be incorporated into the melt at any stage.

The present invention also includes polymer compositions that display a net crosslinking, i.e., the final melt flow is lower than the initial melt flow. Examples include polyethylenes, ethylene-propylene copolymers having about 30% (wt) ethylene or greater, ethylene-propylene-diene terpolymers and the like.

Polymers suitable for vis-breaking or crosslinking according to this invention may be manufactured by all conventional means, including through use of catalysts or initiators as needed to successfully complete the polymerizations. Polymers produced with all varieties of Ziegler-Natta catalysts, metallocene catalysts and other homogeneous or heterogeneous phase catalysts can be processed in according to the process described in this invention. Polymers initiated and propagated with free radicals produced generally at high pressures and temperatures can also be processed per the invention.

The selection of free radical generator is important and should be coordinated with the residence time of the melt mixing device, melt temperature, and number of addition zones. In general, extruders or other melt mixing devices with higher L/D (screw length to diameter ratio) are more flexible in this regard. If the half-life of the free radical generator is too long for the conditions of the melt mixing device, then the number of possible addition zones may be restricted, limiting the benefits available under the invention. The half-life of a given free radical will decrease with increased temperature. The preferred free radical generators include organic peroxides, examples of which include 2,5-dimethyl-2,5-di(t-butylperoxy)hexane, 2,5-dimethyl-2,5-di(t-butylperoxy)hexyne-3, di-t-butyl peroxide, di-cumyl peroxide, di-t-amyl peroxide, t-butyl cumyl peroxide, α,α-bis(t-butylperoxy)diisopropylbenzene, n-butyl-4,4-bis(t-butylperoxy)valerate, 1,1-di(t-butylperoxy)-3,3,5-trimethylcyclohexane, 1,1-di(t-butylperoxy)cyclohexane, 1,1-di(t-amylperoxy)cyclohexane, 2,2-di(t-butylperoxy)butane, ethyl-3,3-di(t-butylperoxy)butyrate, 2,2-di(t-amylperoxy)propane, ethyl-3,3-di(t-amylperoxy)butyrate, t-butylperoxyacetate, t-amylperoxyacetate, t-butylperoxybenzoate, t-amylperoxybenzoate, di-t-butyldiperoxyphthalate, bis-(2-(1,1-dimethylethyl)-peroxyisopropyl)-benzene and the like.

Two or more free radical generators can be used in practicing the invention, although the full benefits of the invention can be achieved using a single free radical generator. When two or more free radical generators are used, they may be added as a mixture to one or more addition points or they may be added separately at different addition points. Table I, below, lists several of these free radical generators, along with the temperature at which the free radical generator will have a half life of one hour.

TABLE I

| FREE RADICAL GENERATOR | TEMP. (°C.) AT WHICH HALF-LIFE IS 1 HOUR |
|---|---|
| di-cumyl peroxide | 135 |
| t-butyl cumyl peroxide | 142 |
| n-butyl-4,4-bis(t-butylperoxy)valerate | 129 |
| 2,5-dimethyl-2,5-di(t-butylperoxy)hexane | 146 |
| 1,1-di(t-butylperoxy)-3,3,5-trimethylcyclohexane | 112 |
| 2,2-di(t-butylperoxy)butane | 122 |
| 2,2-di(t-amylperoxy)propane | 128 |
| ethyl-3,3-di(t-butylperoxy)butyrate | 132 |
| t-butylperoxyacetate | 120 |
| t-amylperoxyacetate | 120 |
| t-butylperoxybenzoate | 125 |
| t-amylperoxybenzoate | 121 |
| di-t-butyldiperoxyphthalate | 123 |

The total amount of free radical generator added ranges from about 50 ppmw to about 5,000 ppmw. The amount added in each zone may vary from 0 to about 70% of the full amount of free radical generator used.

The type and degree of mixing of free radical generator with melt is important for achieving desired results when practicing the invention. In applications in which the melt is of high viscosity, it is important that the processing includes, at least in the first free radical addition zone, dispersive type mixing of the free radical generator in the melt. For example, where the process is practiced in a co-rotating twin-screw extruder, the free radical addition zone can contain forwarding kneading elements followed by reversing kneading elements. Subsequent free radical generator addition zones to varying degrees may be of like mixing capability, i.e., primarily dispersive mixing, or may use gear or toothed disk low energy input elements which provide primarily distributive mixing. The latter elements become more important as viscosity decreases. In applications in which the viscosity of the melt at the first addition zone is low, toothed disk type mixing elements perform satisfactorily.

Particularly with an intermeshing, co-rotating twin-screw extruder, melting takes place very rapidly over high shear kneading elements, so that any solid remaining after passage through a preceding compression zone is normally quickly reduced to melt in the subsequent kneading zone. Kneading blocks having disks of greater width provide improved dispersive mixing, whereas kneading blocks having more narrow disks improve distributive mixing. Varying the stagger of consecutive disks in a kneading block can affect the mixing, conveying and restrictive functions in known ways, so kneading block arrangements suitable for free radical generator addition to a zone where highly dispersive mixing is needed can be readily defined as well as for like addition to a low viscosity melt zones where distributive mixing would be more important.

Other configurations suitable for the practice of this invention include intermeshing and non-intermeshing counter-rotating extruders, extruders preceded by continuous mixers and continuous mixers. Single-screw extruders can be applied to the process of this invention; however, they are less preferred than the above mentioned twin-screw configurations. Side-arm extruders can be coupled to single-screw extruders, and as such, can provide a suitable free radical generator addition/mixing zone; however, degradation of the peroxide or other free radical generator in the side-arm extruder before reaching the main extruder must be avoided. This may be accomplished if the side-arm is run at a lower melt temperature than the main extruder and with a lower melting polymer than the one processed in the main extruder. A side-arm extruder could also be used for downstream addition of additives that could adversely interact with radicals produced from degradation of the free radical generator.

Products produced by the process of the invention have lowered molecular weight except in those instances where crosslinking occurs, whereupon the reverse would be true. For some product needs, combinations of scission and crosslinking may be desirable, as in the treatment of a blend of polypropylene and polyethylene-like material. This blend may be made by direct physical mixing of two or more materials, or may be fabricated in a reactor train involving batch preparation of two or more polymer types or continuous preparation of like compositions in a series of two or more reactors. Products produced according to this invention may also have narrowed molecular weight distributions (MWDs) except in those cases where crosslinking occurs. Fabrication technologies that utilize as feedstock polymer with narrowed MWDs are well known in the art and include fine fiber applications. Alternatively, when the invention is practiced to produce crosslinked polymer, the resulting products exhibit broadened MWDs. This imparts greater melt strength, as is required for thermoforming.

For polymers that undergo scission, melt flows prior to contacting with the free radical generator may range from about 0.1 to about 50 dg/min, and after contacting, they may range from about 2 to about 5,000 dg/min. The latter may need to be measured indirectly at a lower temperature and different weighting, but under conditions that can be correlated with the standard ASTM D 1238 Condition L procedure. It may be necessary to collect polymer toward the higher melt flow end of the stated range by special means known in the an for converting melt to particulate or granular solid suitable for processing in the normal range of converting devices wherein the material is remelted and fabricated into finished articles. This is because the very low viscosity of the fully vis-broken material is unsuitable for conventional pelletization. In those instances the finished particulate morphologies are termed granules, prills and pastilles, depending on the mode of their formation and other factors. On the other hand, there may be no intermediate step between extrusion of reactor product (powder or otherwise) and end use application, as where the direct product of extrusion is the finished article.

With the exception where crosslinking takes place to a great degree because of the presence of a crosslinkable polymer composition, the melt flow after passing through the melt mixing device would be higher than the starting melt flow, and comparison with conventional blending of free radical generator into powder or pellets of the same starting material would show measurable melt flow enhancement for the case with two or more addition/mixing zones relative to the conventional means.

In general, the process of this invention will be carried out in an inert atmosphere, such as nitrogen or argon gas. This minimizes oxidation due to the presence of air. The benefits of the invention can also be realized without strict adherence to maintaining an oxygen-free processing.

An illustrative embodiment can further be described in connection with the accompanying drawing. Referring to the drawing, extruder 1 is a 25 mm screw diameter Berstorff twin-screw extruder with a length to diameter ratio of 33:1. The extruder operates at 300 rpm and is powered by motor 2. Polypropylene is added to extruder 1 at the rate of 15 pounds per hour by means of an auger feeder 14, which conveys polypropylene to extruder feed hopper 3. Polymer falls from feed hopper 3 to feeding zone 4 of the extruder. From feeding zone 4, polymer is conveyed to a high compression zone 5 of extruder 1 wherein it is heated via thermal-mechanical energy input to a temperature that approaches or is above the polymer's melting point and is continuously conveyed downstream to first addition zone 6, wherein free radical generator is added via addition point 7. Optionally, additional free radical addition points can be added to first addition zone 6, with the addition points generally located circumferentially around the extruder. In addition zone 6, polymer is mixed with the free radical generator by means of forward kneading elements which provide dispersive mixing in an environment of molten or substantially molten polymer. Polymer is then conveyed further downstream to extrusion zone 8, wherein the free radical generator and polymer mixture is subjected to reverse kneading elements. As the melt leaves extrusion zone 8, substantially all free radical generator added at first addition zone 6 is decomposed. When the melt arrives downstream at subsequent addition zone 9, additional free radical generator is added to the polymer via addition point 10 and the mixture is subjected to distributive mixing provided by toothed disk mixing elements. The minimum distance of addition zone 9 from addition zone 6 is determined by the half-life of the free radical generator used, the rate at which the polymer passes through the extruder and the processing temperature. The full benefits of the invention are obtained when the distance between addition zones is such that substantially all of the free radical generator added in addition zone 6 is decomposed before the polymer with which it was mixed reaches subsequent addition zone 9. The polymer and free radical generator mixture is conveyed downstream through mixing and metering zones 11 and 12, sequentially. When the polymer arrives at die 13, essentially all free radical generator previously added to the polymer is decomposed. The product of the extrusion then passes through die 13 and is collected as the product of the process. In order to facilitate free radical generator addition at atmospheric pressure, a blister element precedes each point of addition of free radical generator.

EXAMPLE 1

Polypropylene polymer was fed to an extruder by means of a hopper with an auger feeder at the rate of 15 pounds per hour. Free radical generator, in the form of a solution, was added and the degree of degradation of polymer, as expressed by the change in melt flow, was measured under various configurations and conditions. A 25 mm screw diameter, 33:1 L/D Berstorff twin-screw extruder operating at 300 rpm was used.

The free radical generator solution, a liquid peroxide generally mixed with an equal amount of mineral oil but also at other dilutions, was added to the polymer with a Ruska dual syringe-type injection pump through 0.005" ID capillary tubing to insure continuous flow at low injection rates. The free radical generator was Lupersol 101, 2,5-dimethy-2,5-di(t-butylperoxy) hexane, produced by Atochem. The diluting oil was Penreco's Drakeol 34, a white USP paraffinic mineral oil having a low volatility and a specific gravity (0.867) very close to that of Lupersol 101 (0.865) at 25° C. The polymer was maintained in an inert atmosphere with nitrogen at about 0.2 psi. The vent of the extruder was plugged to keep melt out of the extruder's vent. All screw flights were covered with melt. The mixture was stabilized using 100 ppmw Ethanox 330 and 500 ppmw calcium stearate.

Three different polymers were tested. Table I depicts the results of when a pelletized propylene homopolymer with a melt flow of 7.5 dg/min after stabilization was treated with free radical generator. Table II depicts the results when a different pelletized propylene homopolymer, this one with a melt flow of 3.1 dg/min after stabilization was used. Table III depicts the results when a powdered propylene homopolymer with a melt flow of between 0.8 and 1.2 dg/min after stabilization was treated. Table IV depicts a comparison of production of nominally 40 dg/min melt flow polypropylene by the process of this invention with polymer processed according to the conventional mode of pre-blending of free radical generator and polymer, using the same 0.8 to 1.2 dg/min melt flow powder used in Table III.

The system contained three separate locations that could be used for the addition of free radical generator. When more than one addition location was used, the free radical generator was split equally between the addition locations. Free radical generator could be added at the feed hopper, where it was injected directly onto the screw flights containing solid polymer being fed to the extruder or alternatively, it could be pre-mixed with the polymer prior to addition of the polymer to the extruder. As noted, there were two locations along the extruder where the free radical generator could be injected onto molten polymer inside the extruder; one addition location was closer to the feed hopper, and the other addition location was closer to the die.

At the first free radical melt injection location on the extruder, the one closer to the feed hopper, the polymer and free radical generator were immediately mixed with forward kneading elements, followed by reverse kneading elements. This provided dispersive mixing. At the second free radical generator addition location, the one closer to the die, mixing of free radical generator and polymer was accomplished with one toothed mixing element for each of the two screws. This was a lower energy form of mixing that did not impart significant dispersive mixing. In each experimental run, free radical generator added at an addition location was calculated to be fully decomposed before the melt in which it was mixed reached the next free radical addition location or the die, whichever came first. Further, the melt leaving the die was analyzed through gas chromatography methods well known to those skilled in the art which confirmed that substantially all free radical generator had decomposed prior to or at the time it left the die.

TABLE I

| Free Radical Addition Location(s) | Free Radical Generator Added (ppmw) | Melt Flow (dg/min) Stabilized With 0.5% Cyanox 2246 | Melt Flow (dg/min) (Not Stabilized) | Melt Temp. (°C.) | Dilution of Peroxide in Oil (wt % Peroxide) |
|---|---|---|---|---|---|
| M2  | 708  | 131.3 | 148.4 | 236 | 50 |
| MH  | 660  | 64.1  | 72.6  | 239 | 50 |
| MH  | 684  | 96.0  | 104.1 | 237 | 50 |
| MD  | 652  | 16.4  | 28.0  | 242 | 50 |
| B   | 449  | 32.6  | 41.8  | 240 | 50 |
| B   | 1344 | 83.0  | 97.1  | 237 | 50 |
| MHS | 773  | 114.8 | 121.8 | 240 | 50:40:10 (peroxide/oil/surfactant) |
| HHS | 716  | 29.8  | 44.6  | 242 | 50:40:10 (peroxide/oil/surfactant) |

M2: Free radical generator added at two melt addition points.
MH: Free radical generator added at melt addition point closer to the feed hopper.
MD: Free radical generator added at melt addition point closer to the die.
MHS: Free radical generator and 10% wt surfactant (NEODOL ®) added at melt addition point closer to the feed hopper.
HHS: Addition of free radical generator and 10% wt surfactant (NEODOL ®) at hopper with injector from the melt addition point closer to the hopper.
B: Well mixed blend of polymer powder, peroxide and mineral oil fed to extruder at feed hopper.

TABLE II

| Free Radical Addition Location(s) | Free Radical Generator Added (ppmw) | Melt Flow (dg/min) Stabilized With 0.5% Cyanox 2246 | Melt Flow (dg/min) (Not Stabilized) | Melt Temp. (°C.) | Dilution of Peroxide in Oil (wt % Peroxide) |
|---|---|---|---|---|---|
| M2 | 649 | 74.2 | 89.5 | 230 | 50 |
| MH | 706 | 52.5 | 65.2 | 239 | 50 |
| MD | 700 | 10.7 | 14.9 | 243 | 50 |
| H2 | 639 | 13.5 | 16.5 | 240 | 50 |
| B  | 899 | 29.1 | 33.4 | 240 | 50 |

M2: Free radical generator added at two melt addition points.
MH: Free radical generator added at melt addition point closer to the feed hopper.
MD: Free radical generator added at melt addition point closer to the die.
H2: Free radical generator added at feed hopper with two injecters.
B: Well mixed blend of polymer powder, peroxide and mineral oil fed to extruder.

TABLE III

| Free Radical Addition Location(s) | Free Radical Generator Added (ppmw) | Melt Flow (dg/min) Stabilized With 0.5% Cyanox 2246 | Melt Flow (dg/min) (Not Stabilized) | Melt Temp. (°C.) | Dilution of Peroxide in Oil (wt % Peroxide) |
|---|---|---|---|---|---|
| M2 | 820 | 69.4 | 73.2 | 237 | 50 |
| MH | 674 | 48.9 | 59.8 | 240 | 50 |
| MD | 732 | 16.3 | 21.2 | 243 | 50 |
| H2 | 706 | 34.2 | 37.4 | 240 | 50 |
| B  | 900 | 38.0 | 50.3 | 240 | 50 |

M2: Free radical generator added at two melt addition points.
MH: Free radical generator added at melt addition point closer to the feed hopper.
MD: Free radical generator added at melt addition point closer to the die.
H2: Free radical generator added at feed hopper with two injecters.
B: Well mixed blend of polymer powder, peroxide and mineral oil fed to extruder.

TABLE IV

| Free Radical Addition Location(s) | Free Radical Generator Added (ppmw) | Melt Flow (dg/min) Stabilized With 0.5% Cyanox 2246 | Melt Flow (dg/min) (Not Stabilized) | Melt Temp. (°C.) | Dilution of Peroxide in Oil (wt % Peroxide) |
|---|---|---|---|---|---|
| M2 | 377 | 40.9 | 49.2 | 239 | 25 |
| B | 898 | 36.8 | 47.4 | 240 | 25 |

M2: Free radical generator added at two melt addition points.
B: Well mixed blend of polymer, powder peroxide and mineral oil fed to extruder.

What is claimed is:

1. A continuous process for modifying the melt flow of a polyolefin in a melt mixing device comprising:

feeding said polyolefin into said melt mixing device;

heating said polyolefin in said melt mixing device until at least substantially all of said polyolefin is melted; and adding a free radical generator to said melt mixing device at a plurality of addition zones;

wherein substantially all of said free radical generator has decomposed before leaving said melt mixing device.

2. A continuous process for modifying the characteristics of a polyolefin in a melt mixing device comprising:

feeding said polyolefin into said melt mixing device;

heating said polyolefin in said melt mixing device until at least substantially all of said polyolefin is melted;

continuously adding a quantity of free radical generator at a first addition zone of said melt mixing device;

dispersively mixing said quantity of free radical generator and said heated polyolefin;

continuously adding an additional quantity of free radical generator at at least one subsequent addition zone; and distributively mixing said additional quantity of free radical generator with said heated polyolefin in each subsequent addition zone;

wherein substantially all of said free radical generator has decomposed before leaving said melt mixing device.

3. The process of claim 1 or claim 2 wherein at least about 80% of said free radical generator added at an upstream addition zone has decomposed before reaching the next downstream addition zone.

4. The process of claim 1 or claim 2 wherein at least about 90% of said free radical generator added at an upstream addition zone has decomposed before reaching the next downstream addition zone.

5. The process of claim 1 or claim 2 wherein substantially all of said free radical generator added at an upstream addition zone has decomposed before reaching the next downstream addition zone.

6. The process of claim 1 or claim 2 wherein said free radical generator is added to melted polyolefin.

7. The process of claim 1 or claim 2 wherein said free radical generator is an organic peroxide.

8. The process of claim 2 wherein said free radical generator is selected from the group consisting of 2,5-dimethyl-2,5-di(t-butylperoxy)hexane, 2,5-dimethyl-2,5-di(t-butylperoxy)hexyne-3, di-t-butyl peroxide, di-cumyl peroxide, di-t-amyl peroxide, t-butyl cumyl peroxide, α,α-bis(t-butylperoxy)diisopropylbenzene, n-butyl-4,4-bis(t-butylperoxy)valerate, 1,1-di(t-butylperoxy)-3,3,5-trimethylcyclohexane, 1,1-di(t-butylperoxy)cyclohexane, 1,1-di(t-amylperoxy)cyclohexane, 2,2-di(t-butylperoxy)butane, ethyl-3,3-di(t-butylperoxy)butyrate, 2,2-di(t-amylperoxy)propane, ethyl-3,3-di(t-amylperoxy)butyrate, t-butylperoxyacetate, t-amylperoxyacetate, t-butylperoxybenzoate, t-amylperoxybenzoate, bis-(2-(1,1-dimethylethyl)peroxyisopropyl)-benzene, and di-t-butyldiperoxyphthalate.

9. The process of claim 1 or claim 2 wherein said polyolefin is selected from the group consisting of polypropylene homopolymer, polypropylene copolymer, and propylene terpolymer.

10. The process of claim 1 or claim 2 wherein said polyolefin is a crosslinkable polymer.

11. The process of claim 1 or claim 2 wherein a graftable monomer is added with said free radical generator.

12. The process of claim 1 or claim 2 wherein said polyolefin is comprised of olefinic and non-olefinic monomers.

13. The process of claim 1 or claim 2 wherein the total free radical generator added to said melted polyolefin is between about 50 and about 5,000 ppmw.

14. The process of claim 1 or claim 2 wherein a surfactant is added to said free radical generator.

15. The process of claim 1 or claim 2 wherein said free radical generator is diluted with a mineral oil.

16. The process of claim 1 or claim 2 wherein said melt mixing device is a melt extruder.

17. The process of claim 1 or claim 2 wherein said melt mixing device is a twin-screw extruder.

18. The process of claim 1 or claim 2 wherein said melt mixing device is a co-rotating and intermeshing twin-screw extruder.

19. The process of claim 1 or claim 2 wherein said melt mixing device is a counter-rotating and intermeshing twin-screw extruder.

20. The process of claim 1 or claim 2 wherein said melt mixing device is a counter-rotating and non-intermeshing twin-screw extruder.

21. The process of claim 1 or claim 2 wherein said melt mixing device is a continuous mixer.

* * * * *